United States Patent
Toyoda et al.

(10) Patent No.: US 8,354,468 B2
(45) Date of Patent: Jan. 15, 2013

(54) THERMOPLASTIC ELASTOMER COMPOSITION

(75) Inventors: Nobuyuki Toyoda, Minato-ku (JP); Kentarou Kanae, Minato-ku (JP); Hideo Nakanishi, Minato-ku (JP); Masato Kobayashi, Minato-ku (JP)

(73) Assignee: JSR Corporation, Tokyo (JP)

( * ) Notice: Subject to any disclaimer, the term of this patent is extended or adjusted under 35 U.S.C. 154(b) by 37 days.

(21) Appl. No.: 12/921,315

(22) PCT Filed: Mar. 5, 2009

(86) PCT No.: PCT/JP2009/054195
§ 371 (c)(1),
(2), (4) Date: Sep. 7, 2010

(87) PCT Pub. No.: WO2009/110562
PCT Pub. Date: Sep. 11, 2009

(65) Prior Publication Data
US 2011/0046290 A1 Feb. 24, 2011

(30) Foreign Application Priority Data

Mar. 7, 2008 (JP) ................................. 2008-057326

(51) Int. Cl.
*C08J 3/22* (2006.01)
*C08L 23/00* (2006.01)
(52) U.S. Cl. ...................................... 524/525; 524/528
(58) Field of Classification Search .................... 524/525
See application file for complete search history.

(56) References Cited

U.S. PATENT DOCUMENTS

| 5,449,713 | A | | 9/1995 | Nakahama | |
|---|---|---|---|---|---|
| 6,153,704 | A | * | 11/2000 | Kodama et al. | 525/240 |
| 6,696,516 | B2 | * | 2/2004 | Morikawa et al. | 524/526 |
| 7,683,140 | B2 | * | 3/2010 | Pannell et al. | 526/61 |
| 2007/0173591 | A1 | * | 7/2007 | Kanae et al. | 524/502 |
| 2007/0251572 | A1 | * | 11/2007 | Hoya et al. | 136/256 |

FOREIGN PATENT DOCUMENTS

| JP | 4 309544 | 11/1992 |
|---|---|---|
| JP | 11 269325 | 10/1999 |
| JP | 2002 146125 | 5/2002 |
| JP | 2002 201313 | 7/2002 |
| JP | 2008 144120 | 6/2008 |
| WO | 01 81462 | 11/2001 |

OTHER PUBLICATIONS

International Search Report issued Jun. 9, 2009 in PCT/JP09/54195 filed Mar. 5, 2009.

* cited by examiner

*Primary Examiner* — Hui Chin
(74) *Attorney, Agent, or Firm* — Oblon, Spivak, McClelland, Maier & Neustadt, L.L.P.

(57) ABSTRACT

A thermoplastic elastomer composition that exhibits excellent rubber elasticity, etc. is obtained by dynamically heating a polymer composition in the presence of the crosslinking agent, the polymer composition including an α-olefin thermoplastic resin (A), and an oil-extended ethylene copolymer (B) that includes an ethylene copolymer that satisfies given conditions, and 50 to 150 parts by mass of a first mineral oil-based softener based on 100 parts by mass of the ethylene copolymer, the content of the oil-extended ethylene copolymer (B) being 30 mass % or more based on the total amount (=100 mass %) of the polymer component including the α-olefin thermoplastic resin (A) and the oil-extended ethylene copolymer (B).

18 Claims, 1 Drawing Sheet

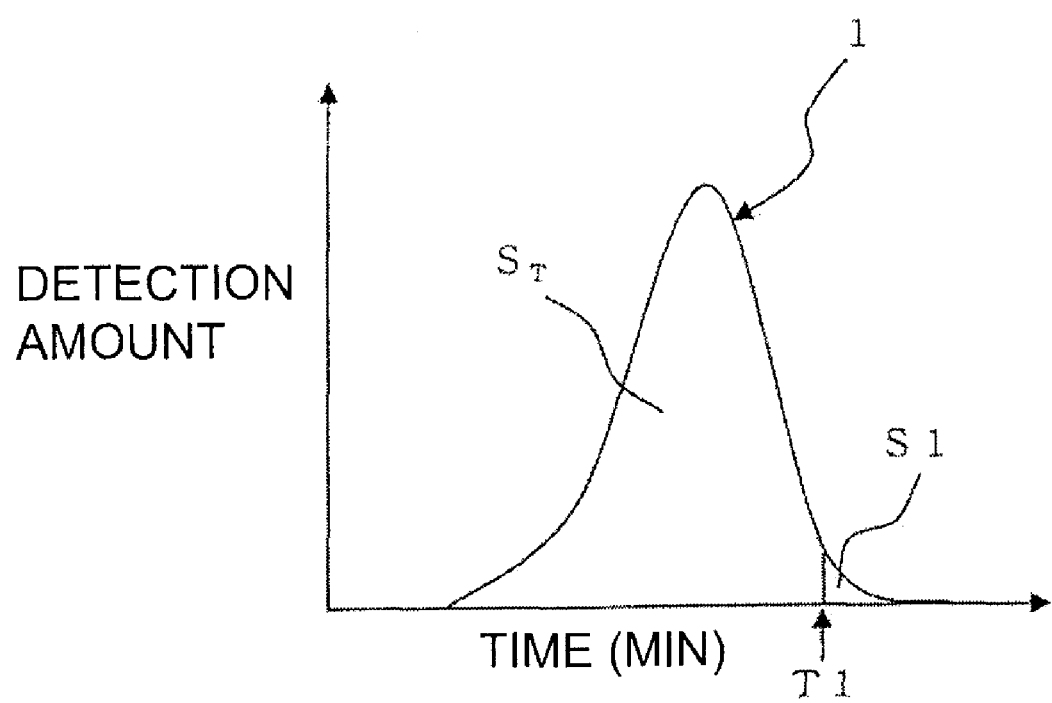

THERMOPLASTIC ELASTOMER COMPOSITION

TECHNICAL FIELD

The present invention relates to a thermoplastic elastomer composition. More specifically, the present invention relates to a thermoplastic elastomer composition that exhibits excellent rubber elasticity, fluidity, adhesion, and softener retention capability.

BACKGROUND ART

An olefin thermoplastic elastomer obtained by dynamically heating a polymer composition that includes an ethylene copolymer and an α-olefin thermoplastic resin in the presence of a crosslinking agent, has been known. The thermoplastic elastomer does not require a vulcanization step, and can be molded by a normal thermoplastic resin molding method (e.g., injection molding, profile extrusion molding, calendering, or blow molding). However, an olefin thermoplastic elastomer exhibits inferior rubber elasticity (i.e., elastic recovery) as compared with vulcanized rubber. In order to solve this problem, attempts have been made to improve the properties of the elastomer by increasing the crosslink density of the ethylene copolymer or increasing the Mooney viscosity of the ethylene copolymer, for example.

The elastic recovery of the elastomer is improved by these methods. However, the mechanical strength of the resulting thermoplastic elastomer composition significantly decreases due to decomposition of the α-olefin thermoplastic resin, or insufficient dispersion of the α-olefin thermoplastic resin and the ethylene copolymer.

It has been proposed to add a large amount of mineral oil-based softener when dynamically heating the composition in the presence of a crosslinking agent in order to improve the fluidity of the composition. However, the mineral oil may bleed out due to insufficient mineral oil retention capability, so that the appearance of a product deteriorates.

In order to solve these problems, a thermoplastic elastomer composition obtained by dynamically heating a polymer composition that includes an olefin resin and an oil-extended ethylene copolymer including an ethylene copolymer having a specific limiting viscosity [η] and a mineral oil-based softener, in the presence of a crosslinking agent, has been proposed (see Patent Documents 1 and 2, for example).
Patent Document 1: Japanese Patent No. 3399384
Patent Document 2: JP-A-2008-144120

DISCLOSURE OF THE INVENTION

The thermoplastic elastomer compositions disclosed in Patent Documents 1 and 2 have an excellent balance between mechanical properties (e.g., flexibility and elastic recovery) and moldability, but do not necessarily exhibit excellent rubber elasticity, fluidity, adhesion, and softener retention capability at the same time. Therefore, a thermoplastic elastomer composition that exhibits excellent rubber elasticity, fluidity, adhesion, and softener retention capability has been desired.

The present invention was conceived to solve the above problems. An object of the present invention is to provide a thermoplastic elastomer composition that exhibits excellent rubber elasticity, fluidity, adhesion, and softener retention capability.

Specifically, the present invention provides the following thermoplastic elastomer composition.

[1] A thermoplastic elastomer composition obtained by dynamically heating a polymer composition in the presence of a crosslinking agent, the polymer composition comprising an α-olefin thermoplastic resin (A), and an oil-extended ethylene copolymer (B) that includes an ethylene copolymer that satisfies the conditions (1) and (2), and 50 to 150 parts by mass of a first mineral oil-based softener based on 100 parts by mass of the ethylene copolymer, the content of the oil-extended ethylene copolymer (B) being 30 mass % or more based on the total amount (=100 mass %) of the polymer component including the α-olefin thermoplastic resin (A) and the oil-extended ethylene copolymer (B).
Condition (1): A limiting viscosity [η] measured at 135° C. in a decalin solvent of 5.5 to 9.0 dl/g.
Condition (2): A ratio (Mw/Mn) of the weight average molecular weight (Mw) to the number average molecular weight (Mn) of 3 or less.

[2] The thermoplastic elastomer composition according to [1], wherein the mass ratio ((A)/(B)) of the α-olefin thermoplastic resin (A) to the oil-extended ethylene copolymer (B) included the polymer component is 5/95 to 70/30.

[3] The thermoplastic elastomer composition according to [1] or [2], wherein the ethylene copolymer is an ethylene-α-olefin-nonconjugated polyene copolymer.

[4] The thermoplastic elastomer composition according to any one of [1] to [3], wherein the polymer composition further comprises a second mineral oil-based softener (C).

[5] The thermoplastic elastomer composition according to any one of [1] to [4], wherein the oil-extended ethylene copolymer (B) is obtained by removing a solvent from a mixture that includes the ethylene copolymer, the first mineral oil-based softener, and a solvent.

[6] The thermoplastic elastomer composition according to any one of [1] to [5], wherein the α-olefin thermoplastic resin (A) includes an α-olefin crystalline thermoplastic resin (a1) and an α-olefin amorphous thermoplastic resin (a2).

[7] The thermoplastic elastomer composition according to [6], wherein the polymer composition includes 2 to 50 mass % of the α-olefin crystalline thermoplastic resin (a1), 2 to 10 mass % of the α-olefin amorphous thermoplastic resin (a2), and 40 to 95 mass % of the oil-extended ethylene copolymer (B) based on 100 mass % of the α-olefin crystalline thermoplastic resin (a1), the α-olefin amorphous thermoplastic resin (a2), and the oil-extended ethylene copolymer (B) in total, and the α-olefin amorphous thermoplastic resin (a2) includes at least one repeating unit selected from the group consisting of a repeating unit derived from ethylene, a repeating unit derived from propylene, and a repeating unit derived from 1-butene.

[8] The thermoplastic elastomer composition according to [6] or [7], wherein the α-olefin crystalline thermoplastic resin (a1) has an elution volume at 80° C. of 30 mass % or less and a melting point of 155° C. or less.

[9] The thermoplastic elastomer composition according to any one of [6] to [8], wherein the polymer composition includes 5 to 400 parts by mass of the second mineral oil-based softener (C) based on 100 parts by mass of the α-olefin crystalline thermoplastic resin (a1), the α-olefin amorphous thermoplastic resin (a2), and the oil-extended ethylene copolymer (B) in total.

The thermoplastic elastomer composition according to the present invention is obtained by dynamically heating a polymer composition in the presence of the crosslinking agent, the polymer composition including the α-olefin thermoplastic resin (A), and the oil-extended ethylene copolymer (B) that includes the ethylene copolymer that satisfies the conditions (1) and (2) described the above and 50 to 150 parts by mass of the first mineral oil-based softener based on 100 parts by mass of the ethylene copolymer, the content of the oil-extended ethylene copolymer (B) being 30 mass % or more based on the total amount (=100 mass %) of the polymer component including the α-olefin thermoplastic resin (A) and the oil-extended ethylene copolymer (B). Therefore, the thermoplastic elastomer composition exhibits excellent rubber elasticity, fluidity, adhesion, and softener retention capability.

BRIEF DESCRIPTION OF THE DRAWINGS

FIG. 1 is a view showing a chromatogram obtained by analyzing an ethylene copolymer by gel permeation chromatography.

EXPLANATION OF SYMBOLS

1: elution curve, T1: time at which components having a polystyrene-reduced molecular weight of 100,000 are eluted, S1: area detected after the elution time T1, $S_T$: total area enclosed by the elution curve 1 and the horizontal axis Best Mode for Carrying out The Invention Preferred embodiments of the present invention are described below. Note that the present invention is not limited to the following embodiments. Various modifications and improvements may be made of the following embodiments without departing from the scope of the present invention based on the knowledge of a person having ordinary skill in the art.

[1] Thermoplastic Elastomer Composition

A thermoplastic elastomer composition according to one embodiment of the present invention is obtained by dynamically heating a polymer composition in the presence of a crosslinking agent, the polymer composition comprising an α-olefin thermoplastic resin (A) (hereinafter may be referred to as "component (A)"), and an oil-extended ethylene copolymer (B) (hereinafter may be referred to as "component (B)") that includes an ethylene copolymer that satisfies the conditions (1) and (2), and 50 to 150 parts by mass of a first mineral oil-based softener based on 100 parts by mass of the ethylene copolymer, the content of the oil-extended ethylene copolymer (B) being 30 mass % or more based on the total amount (=100 mass %) of the polymer component including the α-olefin thermoplastic resin (A) and the oil-extended ethylene copolymer (B).

Condition (1): A limiting viscosity [η] measured at 135° C. in a decalin solvent of 5.5 to 9.0 dl/g.

Condition (2): A ratio (Mw/Mn) of the weight average molecular weight (Mw) to the number average molecular weight (Mn) of 3 or less.

The thermoplastic elastomer composition thus obtained exhibits excellent rubber elasticity, fluidity, adhesion, and softener retention capability.

The thermoplastic elastomer composition according to the present invention may be suitably used as a material for an exterior molding, a weather strip (e.g., window seal gasket, door seal gasket, or trunk seal gasket), a seal material, a damping material, a roll, a wire coating material, a sponge, a hose, a belt, or the like.

The α-olefin thermoplastic resin (A) included in the polymer composition preferably includes an α-olefin crystalline thermoplastic resin (a1) and an α-olefin amorphous thermoplastic resin (a2) (described later), and the polymer composition preferably includes the α-olefin crystalline thermoplastic resin (a1), the α-olefin amorphous thermoplastic resin (a2), and the oil-extended ethylene copolymer (B).

The polymer composition preferably includes 2 to 50 mass % (more preferably 3 to 30 mass %) of the α-olefin crystalline thermoplastic resin (a1), 2 to 20 mass % (more preferably 3 to 15 mass %) of the α-olefin amorphous thermoplastic resin (a2), and 40 to 95 mass % (more preferably 50 to 94 mass %) of the oil-extended ethylene copolymer (B) based on 100 mass % of the α-olefin crystalline thermoplastic resin (a1), the α-olefin amorphous thermoplastic resin (a2), and the oil-extended ethylene copolymer (B) in total. The α-olefin amorphous thermoplastic resin (a2) preferably includes at least one repeating unit selected from the group consisting of a repeating unit derived from ethylene, a repeating unit derived from propylene, and a repeating unit derived from 1-butene.

A thermoplastic elastomer composition obtained using such a polymer composition exhibits excellent fluidity during melting, excellent adhesion to a vulcanized rubber molded article when subjected to injection molding, improved flexibility, and improved rubber elasticity. Therefore, the thermoplastic elastomer composition may be suitably used as a weather strip material.

The α-olefin crystalline thermoplastic resin (a1) preferably has an elution volume at 80° C. of 30 mass % or less and a melting point (i.e., maximum peak temperature determined by differential scanning calorimetry) of 155° C. or less. If the α-olefin crystalline thermoplastic resin (a1) has the above properties, molecular diffusion sufficiently occurs so that adhesion is improved.

The term "elution volume at 80° C." used herein refers to a value measured as follows. The α-olefin crystalline thermoplastic resin (a1) is dissolved in o-dichlorobenzene at a concentration of 4 mg/ml to prepare a solution. The solution is stirred at 80° C. for three hours. Insoluble components are removed by filtration, and dried at 40° C. for 24 hours using a vacuum dryer. The elution volume is calculated by the following expression (i).

Elution volume at 80° C. (%)=[(mass of α-olefin crystalline thermoplastic resin (a1) added to o-dichlorobenzene−mass of dried insoluble components/mass of α-olefin crystalline thermoplastic resin (a1) added to o-dichlorobenzene]×100    Expression (i);

[1-1] α-Olefin Thermoplastic Resin (A);

The α-olefin thermoplastic resin (A) included in the polymer composition used to obtain the thermoplastic elastomer composition according to one embodiment of the present invention affects fluidity, and increases the mechanical strength and the heat resistance of the thermoplastic elastomer composition by reinforcing the thermoplastic elastomer composition.

The α-olefin thermoplastic resin (A) included in the polymer composition used to obtain the thermoplastic elastomer composition according to one embodiment of the present invention preferably includes at least one resin selected from the group consisting of the α-olefin crystalline thermoplastic resin (a1) and the α-olefin amorphous thermoplastic resin (a2), and more preferably includes the α-olefin crystalline thermoplastic resin (a1) and the α-olefin amorphous thermoplastic resin (a2).

[1-1-1] α-Olefin Crystalline Thermoplastic Resin (a1);

The α-olefin crystalline thermoplastic resin (a1) (hereinafter may be referred to as "crystalline polymer (a1)") includes a constituent unit derived from an α-olefin as the main component. Since the crystal structure of such a crystalline polymer (a1) exhibits a reinforcing effect, the mechanical strength of the resulting thermoplastic elastomer composition is improved. The expression "the crystalline polymer (a1) includes a constituent unit derived from an α-olefin as the main component" means that the crystalline polymer (a1) includes 80 mass % or more of a constituent unit derived from an α-olefin based on the total amount (=100 mass %) of the crystalline polymer (a1). The content of a constituent unit derived from an α-olefin is preferably 90 mass % or more. If the content of a constituent unit derived from an α-olefin is less than 80 mass %, the resulting thermoplastic elastomer composition may exhibit low mechanical strength due to a decrease in crystal content.

The crystalline polymer (a1) may be a homopolymer of an α-olefin, a copolymer of two or more α-olefins, or a copolymer of an α-olefin and a monomer other than an α-olefin. The crystalline polymer (a1) may also be a mixture of two or more polymers and/or copolymers.

When the crystalline polymer (a1) is a copolymer, the copolymer may be a random copolymer or a block copolymer. When the crystalline polymer (a1) is a random copolymer, the total content of constituent units included in the random copolymer excluding a constituent unit derived from an α-olefin is preferably 15 mass % or less, and more preferably 10 mass % or less, based on the total amount (=100 mass %) of the random copolymer. If the total content of constituent units excluding a constituent unit derived from an α-olefin exceeds 15 mass %, crystallization may be inhibited so that a sufficient degree of crystallization may not be obtained. When the crystalline polymer (a1) is a block copolymer, the total content of constituent units included in the block copolymer and excluding a constituent unit derived from an α-olefin is preferably 40 mass % or less, and more preferably 20 mass % or less, based on the total amount (=100 mass %) of the block copolymer. If the total content of constituent units excluding a constituent unit derived from an α-olefin exceeds 40 mass %, the resulting thermoplastic elastomer composition may exhibit low mechanical strength due to a decrease in crystal content.

The crystalline polymer (a1) is not particularly limited insofar as the crystalline polymer (a1) is crystalline. It is preferable that the crystalline polymer (a1) have a degree of crystallinity determined by X-ray diffraction of 50% or more, more preferably 53% or more, and particularly preferably 55% or more. The degree of crystallinity is closely related to density. For example, polypropylene has an α-type crystal (monoclinic system) density of 0.936 g/cm$^3$, a smectic microcrystal (pseudohexagonal crystal) density of 0.886 g/cm$^3$, and an amorphous (atactic) component density of 0.850 g/cm$^3$. Poly-1-butene has an isotactic crystal density of 0.91 g/cm$^3$ and an amorphous (atactic) component density of 0.87 g/cm$^3$. Therefore, a crystalline polymer (a1) having a degree of crystallinity of 50% has a density of 0.89 g/cm$^3$ or more. The crystalline polymer (a1) preferably has a density of 0.90 to 0.94 g/cm$^3$. If the degree of crystallinity of the crystalline polymer (a1) is less than 50% (i.e., the density of the crystalline polymer (a1) is less than 0.89 g/cm$^3$), heat resistance, strength, and the like may decrease.

The crystalline polymer (a1) is preferably obtained by polymerizing a monomer in the presence of a known catalyst (e.g., Ziegler-Natta catalyst or metallocene catalyst). The content of low-molecular-weight components and low-crystallinity components can be reduced using a metallocene catalyst, so that a polymer that exhibits excellent heat resistance and oil resistance can be obtained. For example, WINTEC WMG03 or WEG7T (manufactured by Japan Polypropylene Corporation), METOCENE HM562 (manufactured by Lyondell Basel Industries), or the like may be used.

The crystalline polymer (a1) preferably has a melt flow rate (MFR) at a temperature of 230° C. and a load of 5 kg (49 N) of 0.1 to 100 g/10 min, and more preferably 0.5 to 80 g/10 min. If the MFR of the crystalline polymer (a1) is less than 0.1 g/10 min, the thermoplastic elastomer composition may have insufficient kneadability, extrudability, and the like. If the MFR of the crystalline polymer (a1) is more than 100 g/10 min, the strength of a molded article produced using the thermoplastic elastomer composition may decrease.

The crystalline polymer (a1) preferably has an elution volume at 80° C. of 30 mass % or less, more preferably 1 to 25 mass %, and particularly preferably 1 to 20 mass %. If the elution volume of the crystalline polymer (a1) exceeds 30 mass %, a decrease in adhesion may occur due to an increase in the amount of low-melting-point components.

Therefore, the crystalline polymer (a1) is particularly preferably a polypropylene, a propylene-ethylene copolymer or a propylene-ethylene-1-butene copolymer having a degree of crystallinity of 50% or more, a density of 0.89 g/cm$^3$ or more, an ethylene unit content of 20 mass % or less, a $T_m$ of 100° C. or more, an MFR of 0.1 to 100 g/10 min, and a melting point of 140 to 155° C.

[1-1-2] α-Olefin Amorphous Thermoplastic Resin;

The α-olefin amorphous thermoplastic resin (hereinafter may be referred to as "amorphous polymer (a2)") includes a constituent unit derived from an α-olefin as the main component. A thermoplastic elastomer composition obtained using such an amorphous polymer (a2) exhibits improved adhesion to an adherend when injection-molding the thermoplastic elastomer composition together with a vulcanized rubber or a thermoplastic elastomer. The expression "the amorphous polymer (a2) includes a constituent unit derived from an α-olefin as the main component" means that the amorphous polymer (a2) includes 50 mass % or more of a constituent unit derived from an α-olefin based on the total amount (=100 mass %) of the amorphous polymer (a2). The content of a constituent unit derived from an α-olefin is preferably 60 mass % or more. If the content of a constituent unit derived from an α-olefin is less than 50 mass %, the resulting thermoplastic elastomer composition may not exhibit sufficient adhesion to an adherend when injection-molding the thermoplastic elastomer composition together with a vulcanized rubber or a thermoplastic elastomer.

The amorphous polymer (a2) may be a homopolymer of an α-olefin, a copolymer of two or more α-olefins, or a copolymer of an α-olefin and a monomer other than an α-olefin. The amorphous polymer (a2) may also be a mixture of two or more polymers and/or copolymers.

Examples of the amorphous polymer (a2) include a homopolymer (e.g., atactic polypropylene or atactic poly-1-butene), a copolymer of propylene and another α-olefin, a copolymer of 1-butene and another α-olefin, and the like. Examples of a copolymer of propylene and another α-olefin include a copolymer that includes a constituent unit derived from propylene in an amount of 50 mass % or more based on the total amount of the copolymer, and includes ethylene, 1-butene, 1-pentene, 1-hexene, 4-methyl-1-pentene, 1-octene, 1-decene, or the like as the other α-olefin. Examples of a copolymer of 1-butene and another α-olefin include a copolymer that includes a constituent unit derived from 1-butene in an amount of 50 mass % or more based on the total amount of the copolymer, and includes ethylene, propylene, 1-pentene, 1-hexene, 4-methyl-1-pentene, 1-octene, 1-decene, or the like as the other α-olefin.

When the amorphous polymer (a2) is a copolymer, the copolymer may be a random copolymer or a block copolymer. When the amorphous polymer (a2) is a block copolymer, a constituent unit derived from an α-olefin (e.g., propylene or 1-butene) used as the main component must be bonded by means of an atactic structure. When the amorphous copolymer (a2) is a copolymer of ethylene and an α-olefin having 3 or more carbon atoms, the content of a constituent unit derived from the α-olefin is preferably 50 mass % or more, and more preferably 60 to 99 mass %, based on the total amount (=100 mass %) of the amorphous copolymer (a2).

It is particularly preferable that the amorphous polymer (a2) be an atactic polypropylene that includes 50 mass % or more of a structural unit derived from propylene, a propylene-ethylene copolymer that includes 50 mass % or more of a structural unit derived from propylene, or a propylene-1-butene copolymer.

The amorphous polymer (a2) preferably has a melt viscosity at 190° C. of 50,000 cps or less, more preferably 100 to 30,000 cps, and particularly preferably 200 to 20,000 cps. If the melt viscosity of the amorphous polymer (a2) exceeds 50,000 cps, the resulting thermoplastic elastomer composition may exhibit poor adhesive strength (adhesion) with respect to an adherend when injection-molding the thermoplastic elastomer composition together with a vulcanized rubber or a thermoplastic elastomer. The degree of crystallinity of the amorphous polymer (a2) determined by X-ray diffraction is preferably less than 50%, more preferably 30% or less, and particularly preferably 20% or less. If the degree of crystallinity of the amorphous polymer (a2) exceeds 50%, the resulting thermoplastic elastomer composition may exhibit poor adhesive strength (adhesion) with respect to an adherend when injection-molding the thermoplastic elastomer composition together with a vulcanized rubber or a thermoplastic elastomer.

The degree of crystallinity of the amorphous polymer (a2) is closely related to the density in the same manner as the crystalline polymer (a1). The density of the amorphous polymer (a2) is preferably 0.85 g/cm$^3$ or more and less than 0.89 g/cm$^3$, and more preferably 0.85 to 0.88 g/cm$^3$. If the density of the amorphous polymer (a2) exceeds 0.89 g/cm$^3$, the resulting thermoplastic elastomer composition may exhibit poor adhesive strength with respect to an adherend when injection-molding the thermoplastic elastomer composition together with a vulcanized rubber or a thermoplastic elastomer. The number average molecular weight (Mn) of the amorphous polymer (a2) is preferably 1000 to 20,000, and more preferably 1500 to 15,000. The term "number average molecular weight (Mn)" used herein refers to a polystyrene-reduced number average molecular weight determined by gel permeation chromatography.

Specific examples of the amorphous polymer (a2) include REXTAC RT2280, REXTAC RT2780, REXTAC RT2880 (manufactured by Huntsman Advanced Materials KK), VESTOPLAST 508, VESTOPLAST 608, VESTOPLAST 704, VESTOPLAST 708, VESTOPLAST 792 (manufactured by EvonicDegussa GmbH), and the like.

The α-olefin amorphous thermoplastic resin (a2) preferably includes at least one repeating unit selected from the group consisting of a repeating unit derived from ethylene, a repeating unit derived from propylene, and a repeating unit derived from 1-butene. This configuration improves miscibility with the crystalline polymer (a1) and the ethylene-α-olefin polymer (ethylene copolymer), so that the rubber elasticity and the adhesion of the thermoplastic elastomer composition are improved. Such a thermoplastic elastomer composition may be suitably used as a weather strip material, for example.

[1-2] Oil-Extended Ethylene Copolymer (B);

The oil-extended ethylene copolymer (B) included in the polymer composition used to obtain the thermoplastic elastomer composition according to one embodiment of the present invention includes the ethylene copolymer that satisfies the above conditions (1) and (2), and 50 to 150 parts by mass of the first mineral oil-based softener based on 100 parts by mass of the ethylene copolymer.

Since such an oil-extended ethylene copolymer (B) contains only a small number of molecular chains that exhibit poor deformation recovery, the resulting thermoplastic elastomer composition exhibits excellent rubber elasticity. Since the oil-extended ethylene copolymer (B) contains only a small amount of ultra-high-molecular-weight components having high melt viscosity, the oil-extended ethylene copolymer (B) exhibits excellent dispersibility with other components (e.g., α-olefin thermoplastic resin (A)). Therefore, the resulting thermoplastic elastomer composition exhibits excellent mechanical strength. Since the oil-extended ethylene copolymer (B) (particularly the ethylene copolymer) contains only a small amount of low-molecular-weight components, the resulting thermoplastic elastomer composition exhibits an excellent softener retention capability (i.e., can retain a large amount of mineral oil-based softener). Therefore, the resulting thermoplastic elastomer composition exhibits excellent moldability.

The oil-extended ethylene copolymer (B) is preferably obtained by removing a solvent from a mixture that includes the ethylene copolymer, the first mineral oil-based softener, and a solvent. Since the oil-extended ethylene copolymer (B) thus obtained has a viscosity lower than that of the ethylene copolymer, the oil-extended ethylene copolymer (B) exhibits excellent dispersibility with other components (e.g., α-olefin thermoplastic resin (A)). Moreover, since the first mineral oil-based softener is uniformly dispersed in the ethylene copolymer, the first mineral oil-based softener rarely bleeds out.

[1-2-1] Ethylene Copolymer;

The ethylene copolymer included in the oil-extended ethylene copolymer (B) satisfies the above conditions (1) and (2). The oil-extended ethylene copolymer (B) that includes such an ethylene copolymer contains only a small number of molecular chains that exhibit poor deformation recovery, and contains only a small amount of ultra-high-molecular-weight components having high melt viscosity.

Examples of the ethylene copolymer include an ethylene-α-olefin binary copolymer, an ethylene-α-olefin-nonconjugated polyene ternary copolymer, and the like.

The α-olefin used to obtain an ethylene-α-olefin copolymer is preferably an α-olefin having 3 to 20 carbon atoms, more preferably an α-olefin having 3 to 12 carbon atoms, and particularly preferably an α-olefin having 3 to 8 carbon atoms. Specific examples of the α-olefin include propylene, 1-butene, 1-pentene, 1-hexene, 1-heptene, 1-octene, 1-decene, and the like. Among these, propylene, 1-butene, 1-hexene, and 1-octene are preferable from the viewpoint of industrial availability, with propylene being particularly preferable. These α-olefins may be used either individually or in combination.

The content of a structural unit derived from ethylene in the ethylene-α-olefin copolymer is preferably 50 to 80 mass %, more preferably 54 to 75 mass %, and particularly preferably 60 to 70 mass %, based on the total content of structural units. If the content of a structural unit derived from ethylene is within the above range, the balance between mechanical strength and flexibility is improved. If the content of a structural unit derived from ethylene is less than 50 mass %, the crosslinking efficiency may decrease (particularly when using an organic peroxide as a crosslinking agent) so that sufficient mechanical strength may not be obtained. If the content of a structural unit derived from ethylene exceeds 80 mass %, flexibility may decrease.

Examples of the α-olefin used to obtain the ethylene-α-olefin-nonconjugated polyene copolymer include the -α-olefins mentioned above in connection with the ethylene-α-olefin copolymer. The content of a structural unit derived from ethylene in the ethylene-α-olefin-nonconjugated polyene copolymer is preferably 50 to 80 mass %, more preferably 54 to 75 mass %, and particularly preferably 60 to 70 mass %, based on the total content of structural units. If the content of a structural unit derived from ethylene is within the above range, the balance between mechanical strength and flexibility is improved. If the content of a structural unit derived from ethylene is less than 50 mass %, the crosslinking efficiency may decrease (particularly when using an organic peroxide as a crosslinking agent) so that sufficient mechanical strength may not be obtained. If the content of a structural unit derived from ethylene exceeds 80 mass %, flexibility may decrease.

Examples of the nonconjugated polyene used to obtain the ethylene-α-olefin-nonconjugated polyene copolymer include cyclic polyenes such as 5-ethylidene-2-norbornene, dicyclopentadiene, 5-propylidene-2-norbornene, 5-vinyl-2-norbornene, 2,5-norbornadiene, 1,4-cyclohexadiene, 1,4-cyclooctadiene, and 1,5-cyclooctadiene, chain polyenes having 6 to 15 carbon atoms and including an unsaturated bond, such as 1,4-hexadiene, 4-methyl-1,4-hexadiene, 5-methyl-1,4-hexadiene, 5-methyl 1,5-heptadiene, 6-methyl-1,5-heptadiene, 6-methyl-1,6-octadiene, 7-methyl-1,6-octadiene, 5,7-dimethyl-1,6-octadiene, 7-methyl-1,7-nonadiene, 8-methyl-1,7-nonadiene, 8-methyl-1,8-decadiene, 9-methyl-1,8-decadiene, 4-ethylidene-1,6-octadiene, 7-methyl-4-ethylidene-1,6-octadiene, 7-methyl-4-ethylidene-1,6-nonadiene, 7-ethyl-4-ethylidene-1,6-nonadiene, 6,7-dimethyl-4-ethylidene 1,6-octadiene, and 6,7-dimethyl-4-ethylidene-1,6-nonadiene, and α,ω-dienes such as 1,5-hexadiene, 1,6-heptadiene, 1,7-octadiene, 1,8-nonadiene, 1,9-decadiene, 1,10-undecadien, 1,11-dodecadiene, 1,12-tridecadiene, and 1,13-tetradecadiene. Among these, 5-ethylidene-2-norbornene, dicyclopentadiene, 5-vinyl-2-norbornene, 7-methyl-1,6-octadiene, and 5-methyl-1,4-hexadiene are preferable, with 5-ethylidene-2-norbornene being particularly preferable. These nonconjugated polyenes may be used either individually or in combination.

The nonconjugated polyene is preferably used in such an amount that the resulting ethylene-α-olefin-nonconjugated polyene copolymer has an iodine value of 0 to 40, and more preferably 0 to 30. The iodine value is a value that is used as a standard for the content of a structural unit derived from the nonconjugated polyene in the copolymer. If the iodine value of the ethylene-α-olefin-nonconjugated polyene copolymer is more than 40, gelation may occur during kneading. As a result, unmelted resin particles may occur during molding (e.g., extrusion).

The ethylene copolymer satisfies the above condition (1). Specifically, the ethylene copolymer has a limiting viscosity [η] measured at 135° C. in a decalin solvent of 5.5 to 9.0 dl/g, preferably 5.5 to 8.5 dl/g, more preferably 5.5 to 8.0 dl/g, and particularly preferably 5.5 to 7.5 dl/g. If the limiting viscosity [η] of the ethylene copolymer is less than 5.5 dl/g, rubber elasticity may decrease. If the limiting viscosity [η] of the ethylene copolymer exceeds 9.0 dl/g, industrial productivity may decrease due to too high a viscosity. The limiting viscosity [η] may be measured using an Ubbelohde viscometer, for example.

The ethylene copolymer satisfies the above condition (2). Specifically, the ethylene copolymer has a ratio (Mw/Mn) of the weight average molecular weight (Mw) to the number average molecular weight (Mn) of 3 or less, preferably 2.8 or less, and more preferably 2.0 to 2.7. If the ratio of the weight average molecular weight to the number average molecular weight is more than 3, rubber elasticity, softener retention capability, and moldability may decrease. The term "weight average molecular weight (Mw)" used herein refers to a polystyrene-reduced weight average molecular weight determined by gel permeation chromatography.

The ethylene copolymer preferably has a ratio of an area corresponding to a polystyrene-reduced molecular weight of 100,000 or less measured using a gel permeation chromatogram of 3% or less, more preferably 0 to 3%, and particularly preferably 0 to 2.5%. If the above ratio exceeds 3%, rubber elasticity and softener retention capability may decrease.

Calculating method of the ratio of an area corresponding to a polystyrene-reduced molecular weight of 100,000 or less measured using a gel permeation chromatogram is explained specifically as follows referencing to FIG. 1. FIG. 1 is a view showing a chromatogram obtained by analyzing the ethylene copolymer by gel permeation chromatography. An integral value (i.e., total area enclosed by an elution curve 1 and the horizontal axis ("$S_T$" in FIG. 1)) of the elution curve 1 of the chromatogram shown in FIG. 1 is calculated. An integral value (area ("S1" in FIG. 1)) of an area detected after a time T1 (elution time) at which components having a polystyrene-reduced molecular weight of 100,000 are eluted is then calculated. The "ratio of an area corresponding to a polystyrene-reduced molecular weight of 100,000 or less measured using a gel permeation chromatogram" is determined by the expression "$(S1/S_T) \times 100$".

The ethylene copolymer may be appropriately produced by gas-phase polymerization, solution polymerization, slurry polymerization, or the like. The polymerization operation may be performed either batchwise or continuously. When using solution polymerization or slurry polymerization, an inert hydrocarbon may be used as a reaction medium. Examples of an inert hydrocarbon solvent include aliphatic hydrocarbons such as n-pentane, n-hexane, n-heptane, n-octane, n-decane, and n-dodecane; alicyclic hydrocarbons such as cyclohexane and methylcyclohexane; aromatic hydrocarbons such as benzene, toluene, and xylene; and the like. These hydrocarbon solvents may be used either individually or in combination.

Examples of a polymerization catalyst used when producing the ethylene copolymer include an olefin polymerization catalyst that includes an organometallic compound and a compound of a transition metal selected from the group consisting of V, Ti, Zr, and Hf, and the like. The transition metal compound and the organometallic compound may be used either individually or in combination.

Examples of the olefin polymerization catalyst include a metallocene catalyst that includes a metallocene compound and an organoaluminum compound or an ionic compound that reacts with the metallocene compound to form an ionic complex, a Ziegler-Natta catalyst that includes a vanadium compound and an organoaluminum compound, and the like. Hydrogen gas may be used as a molecular weight modifier when producing the ethylene copolymer. The amount of hydrogen gas used is determined depending on the polymerization conditions (e.g., type of catalyst, amount of catalyst, polymerization temperature, and polymerization pressure) and the polymerization process (e.g., polymerization scale, stirring conditions, and charging method). When using solution polymerization that utilizes a Ziegler-Natta catalyst, hydrogen gas is preferably used in an amount of 0.01 to 20 ppm, and more preferably 0.1 to 10 ppm, based on the total amount of monomer component.

[1-2-2] First Mineral Oil-Based Softener;

The first mineral oil-based softener included in the oil-extended ethylene copolymer (B) is used to provide the thermoplastic elastomer composition with moldability and flexibility, and improve the appearance of a product. Examples of the mineral oil-based softener include an aromatic mineral oil-based softener, a naphthenic mineral oil-based softener, a paraffinic mineral oil-based softener, and the like. Among these, a paraffinic mineral oil-based softener or a naphthenic mineral oil-based softener having an aniline point of 90 to 150° C. is preferable due to high miscibility with the ethylene copolymer (i.e., excellent softener retention capability and weatherability are achieved).

The first mineral oil-based softener is used in an amount of 50 to 150 parts by mass, preferably 80 to 140 parts by mass, and more preferably 90 to 130 parts by mass, based on 100 parts by mass of the ethylene copolymer. If the amount of the first mineral oil-based softener is less than 50 parts by mass, flexibility and moldability may decrease. If the amount of the first mineral oil-based softener exceeds 150 parts by mass, industrial productivity may decrease due to occurrence of stickiness.

The oil-extended ethylene copolymer (B) maybe in the shape of a bale, crumb, pellets, or the like. It is preferable that the oil-extended ethylene copolymer (B) be non-crystalline or low crystalline from the viewpoint of improving the flexibility and the elastic recovery of the resulting composition. Since the degree of crystallinity is closely related to density, the degree of crystallinity is generally indicated by density that can be more conveniently measured than the degree of crystallinity itself. The oil-extended ethylene copolymer (B) included in the polymer composition used to obtain the thermoplastic elastomer composition according to one embodiment of the present invention preferably has a density of 0.89 g/cm$^3$ or less. The degree of crystallinity of the ethylene copolymer determined by X-ray diffraction is preferably 20% or less, and more preferably 15% or less. If the degree of crystallinity of the ethylene copolymer exceeds 20%, the flexibility of the ethylene copolymer may decrease.

The oil-extended ethylene copolymer (B) may be produced by an arbitrary method. For example, the oil-extended ethylene copolymer (B) may be produced by preparing a mixture that includes the ethylene copolymer, the first mineral oil-based softener, and a solvent, and removing the solvent from the mixture. Specific examples of the method of producing the oil-extended ethylene copolymer (B) include a method that adds a given amount of the first mineral oil-based softener to an ethylene copolymer solution obtained by polymerization, kneads the mixture using a kneader to obtain a kneaded product, and removes the solvent from the kneaded product by steam stripping, flushing, or the like; a method that uniformly dissolves the dried ethylene copolymer in a good solvent such as a hydrocarbon solvent (e.g., benzene, toluene, xylene, hexane, heptane, or cyclohexane) or a halogenated hydrocarbon solvent (e.g., chlorobenzene) to obtain a solution, adds a given amount of the first mineral oil-based softener to the solution, kneads the mixture using a kneader to obtain a kneaded product, and removes the solvent from the kneaded product by steam stripping, flushing, or the like; and the like. As the kneader, a kneader generally used for oil extension of rubber, such as a Banbury mixer, a pressure kneader, or a roll, may be used.

[1-2-3] Additional Polymer;

The polymer component may include a polymer (hereinafter may be referred to as "additional polymer") other than the components (A) and (B). Examples of the additional polymer include rubber polymers such as butadiene rubber, butyl rubber, and NBR, thermoplastic resins such as an acrylic resin, thermoplastic elastomers such as a hydrogenated diene polymer, organopolysiloxanes, modified organopolysiloxanes, and the like. The content of the additional polymer is preferably 1 to 50 mass %, more preferably 2 to 45 mass %, and particularly preferably 3 to 40 mass %, based on the total amount (=100 mass %) of the polymer component. If the content of the additional polymer is less than 1 mass %, a sufficient effect may not be obtained. If the content of the additional polymer exceeds 50 mass %, rubber elasticity may decrease.

Examples of the organopolysiloxanes include unmodified organopolysiloxanes such as dimethylpolysiloxane, methylphenylpolysiloxane, fluoropolysiloxane, tetramethyltetraphenylpolysiloxane, and methylhydrogenpolysiloxane. Examples of the modified organopolysiloxanes include organopolysiloxanes that are chemically modified with a functional group (e.g., acryl-modified, epoxy-modified, alkyl-modified, amino-modified, carboxyl-modified, alcohol-modified, fluorine-modified, alkylaryl polyether-modified, or epoxy polyether-modified organopolysiloxanes). Among these, it is preferable to use an organopolysiloxane having a viscosity (25° C.) in accordance with JIS K 2283 of less than 10,000 cSt and an unmodified organopolysiloxane having a viscosity (25° C.) in accordance with JIS K 2283 of 10,000 cSt or more in combination since a significant improvement in sliding properties is achieved.

The additional polymer may be added to the polymer composition, or may be added after dynamic heating of the polymer composition in the presence of the crosslinking agent.

The mass ratio ((A)/(B)) of the α-olefin thermoplastic resin (A) to the oil-extended ethylene copolymer (B) included in the polymer component is preferably 5/95 to 70/30, more preferably 10/90 to 70/30, and particularly preferably 10/90 to 60/40. If the mass ratio of the α-olefin thermoplastic resin (A) to the oil-extended ethylene copolymer (B) is within the above range, the balance between rubber elasticity and fluidity is improved. If the mass ratio of the α-olefin thermoplastic resin (A) to the oil-extended ethylene copolymer (B) is too small (i.e., less than 5), fluidity may decrease. If the mass ratio of the α-olefin thermoplastic resin (A) to the oil-extended ethylene copolymer (B) is too large (i.e., more than 70), rubber elasticity may decrease.

The content of the oil-extended ethylene copolymer (B) in the polymer composition used to obtain the thermoplastic elastomer composition according to one embodiment of the present invention is 30 mass % or more, preferably 35 to 95 mass %, and more preferably 40 to 90 mass %, based on the total amount (=100 mass %) of the polymer component including the α-olefin thermoplastic resin (A) and the oil-extended ethylene copolymer (B). If the content of the oil-extended ethylene copolymer (B) is less than 30 mass %, rubber elasticity may decrease.

[1-3] Second Mineral Oil-Based Softener (C);

It is preferable that the polymer composition used to obtain the thermoplastic elastomer composition according to one embodiment of the present invention further include a second mineral oil-based softener (C). The second mineral oil-based softener (C) provides the thermoplastic elastomer composition with moldability and flexibility, and improves the appearance of a product. Examples of the second mineral oil-based softener (C) include the mineral oil-based softeners mentioned above in connection with the first mineral oil-based softener. Specifically, an aromatic mineral oil-based softener, a naphthenic mineral oil-based softener, a paraffinic mineral oil-based softener, or the like may be used. Among these, a paraffinic mineral oil-based softener or a naphthenic mineral oil-based softener having an aniline point of 90 to 150° C. is preferable due to high miscibility with the ethylene copolymer (oil-extended ethylene copolymer (B)) (i.e., excellent softener retention capability and weatherability are achieved).

The content of the second mineral oil-based softener (C) is preferably 0 to 400 parts by mass, more preferably 0 to 100 parts by mass, particularly preferably 0 to 50 parts by mass, and most preferably 0 to 30 parts by mass, based on the total amount (=100 parts by mass) of the polymer component including the α-olefin thermoplastic resin (A) and the oil-extended ethylene copolymer (B). If the content of the second mineral oil-based softener (C) is more than 400 parts by mass, the mineral oil may bleed out, so that the appearance of a product may deteriorate.

It is preferable that the polymer composition used to obtain the thermoplastic elastomer composition according to one embodiment of the present invention further include a silicone oil as an additional softener.

Examples of the silicone oil include unmodified organopolysiloxanes such as dimethylpolysiloxane, methylphenylpolysiloxane, fluoropolysiloxane, tetramethyltetraphenylpolysiloxane, and methylhydrogenpolysiloxane. Examples of modified organopolysiloxanes include organopolysiloxanes that are chemically modified with a functional group (e.g., acryl-modified, epoxy-modified, alkyl-modified, amino-modified, carboxyl-modified, alcohol-modified, fluorine-modified, alkylaryl polyether-modified, or epoxy polyether-modified organopolysiloxanes). Among these, it is preferable to use an organopolysiloxane having a viscosity (25° C.) in accordance with JIS K 2283 of less than 10,000 cSt and an unmodified organopolysiloxane having a viscosity (25° C.) in accordance with JIS K 2283 of 10,000 cSt or more in combination since a significant improvement in sliding properties is achieved.

Examples of commercially available products of the silicone oil include Silicone Oil SH-200 (manufactured by Dow Corning Toray Silicone Co., Ltd.), X-21-3043 (manufactured by Shin-Etsu Chemical Co., Ltd.), and the like.

The silicone oil may be added to the polymer composition, or may be added after dynamic heating of the polymer composition in the presence of the crosslinking agent.

The content of the silicone oil is preferably 0.1 to 10 parts by mass, more preferably 0.5 to 8 parts by mass, and particularly preferably 1 to 7 parts by mass, based on 100 parts by mass of the α-olefin crystalline thermoplastic resin (a1), the α-olefin amorphous thermoplastic resin (a2), and the oil-extended ethylene copolymer (B) in total. If the content of the silicone oil is within the above range, a thermoplastic elastomer composition that may be suitably used as a weather strip material is obtained. If the content of the silicone oil is less than 0.1 parts by mass, good sliding properties may not be obtained due to an increase in coefficient of friction. If the content of the silicone oil exceeds 10 parts by mass, a sufficient material strength may not be obtained, or the appearance of a molded article may deteriorate due to bleeding.

[1-4] Crosslinking Agent;

The crosslinking agent used to obtain the thermoplastic elastomer composition according to one embodiment of the present invention is not particularly limited insofar as the crosslinking agent is normally used to crosslink an ethylene copolymer (e.g., EPM or EPDM). Examples of the crosslinking agent include sulfur, a sulfur compound, an organic peroxide, a phenol resin crosslinking agent, a quinoid crosslinking agent, a metal acrylate crosslinking agent, a bismaleimide crosslinking agent, and the like.

[1-4-1] Sulfur and Sulfur Compound;

Commercially available sulfur and sulfur compounds that are normally used for vulcanization of rubber may be used. Examples of sulfur include powdered sulfur, sublimed sulfur, precipitated sulfur, colloidal sulfur, surface-treated sulfur, insoluble sulfur, and the like. Examples of the sulfur compound include sulfur chloride; sulfur dichloride; morpholine disulfide; alkylphenol disulfide; thioureas such as dibutyl thiourea; thiazoles such as mercaptobenzothiazole, dibenzothiazyl disulfide, and 2-(4-morpholinodithio)benzothiazole; dithiocarbamates such as zinc dimethyldithiocarbamate, zinc diethyldithiocarbamate, and sodium dimethyldithiocarbamate; and the like. These sulfur compounds may be used either individually or in combination.

The content of sulfur or the sulfur compound is preferably 0.1 to 5 parts by mass, more preferably 0.3 to 4 parts by mass, and particularly preferably 0.5 to 3 parts by mass, based on the total amount (=100 parts by mass) of the α-olefin thermoplastic resin (A) and the oil-extended ethylene copolymer (B). If the content of sulfur or the sulfur compound is less than 0.1 parts by mass, rubber elasticity may decrease due to an insufficient crosslinking reaction. If the content of sulfur or the sulfur compound exceeds 5 parts by mass, fluidity may decrease.

[1-4-2] Organic Peroxide;

Examples of the organic peroxide include dicumyl peroxide, di-t-butyl peroxide, 2,5-dimethyl-2,5-di(t-butylperoxy)hexane, 2,5-dimethyl-di(t-butylperoxy)hexin-3,1,3-bis(t-butylperoxyisopropyl)benzene, 1,1-bis(t-butylperoxy)-3,3,5-trimethylcyclohexane, n-butyl-4,4-bis(t-butylperoxy) valerate, benzoyl peroxide, p-chlorobenzoyl peroxide, 2,4-dichlorbenzoyl peroxide, t-butyl peroxybenzoate, t-butylperoxy isopropyl carbonate, diacetyl peroxide, lauroyl peroxide, t-butyl peroxide, and the like. Among these, it is preferable to use an organic peroxide that ensures that a decomposition reaction proceeds mildly, and a crosslinking reaction proceeds after the polymer component has been uniformly mixed.

An organic peroxide having a sufficiently high one-minute half-life temperature (i.e., 150° C. or more) ensures that a decomposition reaction proceeds mildly, and a crosslinking reaction proceeds after the polymer component has been uniformly mixed. Specific examples of such an organic peroxide include 2,5-dimethyl-2,5-di(t-butylperoxy)-hexin-3,2,5-dimethyl-2,5-di(t-butylperoxy)hexane, 1,3-bis(t-butylperoxyisopropyl)benzene, and the like. These organic peroxides may be used either individually or in combination.

When using an appropriate crosslinking promoter in combination with the organic peroxide, a crosslinking reaction proceeds uniformly and mildly so that uniform crosslinking can be achieved. Examples of the crosslinking promoter include sulfur, p-quinonedioxime, p,p'-dibenzoylquinonedioxime, ethylene glycol dimethacrylate, diethylene glycol dimethacrylate, triethylene glycol dimethacrylate, tetraethylene dimethacrylate, polyethylene glycol dimethacrylate, trimethylolpropane trimethacrylate, diaryl phthalate, diaryl phthalatetetraaryloxyethane, triaryl cyanurate, diaryl phthalate, tetraaryloxyethane, triaryl cyanurate, N,N-m-phenylenebismaleimide, maleic anhydride, divinylbenzene, zinc di(meth)acrylate, aluminum tri(meth)acrylate, magnesium di(meth)acrylate, and the like. Among these, N,N-m-phenylenebismaleimide, p,p'-dibenzoylquinonedioxime, and divinylbenzene are preferable since uniform crosslinking can be achieved. These crosslinking promoters may be used either individually or in combination.

The content of the organic peroxide is preferably 0.02 to 3.0 parts by mass, and more preferably 0.1 to 2.0 parts by mass, based on the total amount (=100 parts by mass) of the α-olefin thermoplastic resin (A) and the oil-extended ethylene copolymer (B). If the content of the organic peroxide is within the above range, a crosslinking reaction proceeds uniformly and mildly. If the content of the organic peroxide is less than 0.02 parts by mass, rubber elasticity may decrease due to insufficient crosslinking. If the content of the organic peroxide exceeds 3.0 parts by mass, mechanical strength may decrease.

The content of the crosslinking aid is preferably 3 parts by mass or less, and more preferably 0.2 to 2 parts by mass, based on the total amount (=100 parts by mass) of the α-olefin thermoplastic resin (A) and the oil-extended ethylene copolymer (B). If the content of the crosslinking aid is within the above range, the resulting thermoplastic elastomer composition maintains phase structure (island structure) uniformity and moldability. If the content of the crosslinking aid exceeds 3 parts by mass, the crosslinking aid may remain in the thermoplastic elastomer composition as unreacted monomers. As a result, the properties of the thermoplastic elastomer composition may change due to heat history when molding the thermoplastic elastomer composition.

[1-4-3] Phenol Resin Crosslinking Agent;

Examples of the phenol resin crosslinking agent include a compound shown by the following general formula (1).

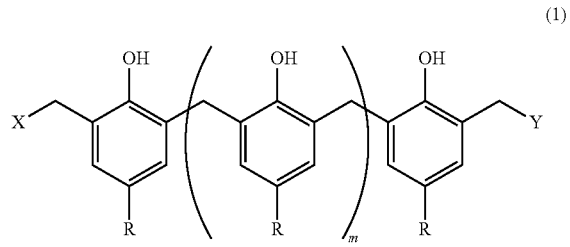

(1)

wherein m is an integer from 0 to 10, X and Y independently represent a hydroxyl group or a halogen atom, and R represents a saturated hydrocarbon group having 1 to 15 carbon atoms.

The compound shown by the general formula (1) is generally used as a rubber crosslinking agent (see U.S. Pat. No. 3,287,440 and U.S. Pat. No. 3,709,840, for example). The compound shown by the general formula (1) may be produced by polycondensation of a substituted phenol and an aldehyde in the presence of an alkaline catalyst.

The content of the phenol resin crosslinking agent is preferably 0.1 to 10 parts by mass, more preferably 0.3 to 5 parts by mass, and particularly preferably 0.4 to 3 parts by mass, based on the total amount (=100 parts by mass) of the α-olefin thermoplastic resin (A) and the oil-extended ethylene copolymer (B). If the content of the phenol resin crosslinking agent is within the above range, the resulting thermoplastic elastomer composition has an appropriate degree of partial crosslinking, and exhibits excellent oil resistance, shape recovery, and flexibility. If the content of the phenol resin crosslinking agent is less than 0.1 parts by mass, rubber elasticity may decrease due to insufficient crosslinking. If the content of the phenol resin crosslinking agent exceeds 10 parts by mass, fluidity may decrease. The phenol resin crosslinking agent may be used in combination with a crosslinking promoter in order to adjust the crosslinking rate.

Examples of the crosslinking promoter that maybe used in combination with the phenol resin crosslinking agent include metal halides (e.g., stannous chloride and ferric chloride), organic halides (e.g., chlorinated polypropylene, brominated polypropylene, brominated butyl rubber, and chloroprene rubber), and the like. A dispersant such as a metal oxide (e.g., zinc oxide) or stearic acid may also be used in addition to the crosslinking promoter.

[1-4-4] Quinoid Crosslinking Agent;

Examples of the quinoid crosslinking agent include derivatives of p-quinonedioxime, and the like. Specific examples of the quinoid crosslinking agent include p-benzoquinonedioxime, p-dibenzoylquinonediamide, and the like.

The content of the quinoid crosslinking agent is preferably 0.2 to 10 parts by mass, more preferably 0.5 to 7 parts by mass, and particularly preferably 0.8 to 3 parts by mass, based on the total amount (=100 parts by mass) of the α-olefin thermoplastic resin (A) and the oil-extended ethylene copolymer (B). If the content of the quinoid crosslinking agent is within the above range, the resulting thermoplastic elastomer composition has an appropriate degree of partial crosslinking, and exhibits excellent oil resistance, shape recovery, and flexibility. If the content of the quinoid crosslinking agent is less than 0.2 parts by mass, rubber elasticity may decrease due to insufficient crosslinking. If the content of the quinoid crosslinking agent exceeds 10 parts by mass, fluidity may decrease. The quinoid crosslinking agent maybe used in combination with a crosslinking promoter in order to adjust the crosslinking rate.

Examples of the crosslinking promoter that may be used in combination with the quinoid crosslinking agent include oxidizing agents such as lead oxide, dibenzothiazoyl sulfide, and tetrachlorodibenzoquinone. A dispersant such as a metal oxide (e.g., zinc oxide) or stearic acid may also be used in addition to the crosslinking promoter.

[1-4-5] Metal Acrylate Crosslinking Agent;

The metal acrylate crosslinking agent is a metal salt (e.g., zinc or calcium salt) of acrylic acid or methacrylic acid. The metal acrylate crosslinking agent may be obtained by reacting zinc oxide or zinc carbonate with methacrylic acid, for example. Specific examples of the metal acrylate crosslinking agent include zinc dimethacrylate, calcium dimethacrylate, magnesium dimethacrylate, monohydroxyaluminum dimethacrylate, aluminum trimethacrylate, calcium diacrylate, magnesium diacrylate, monohydroxyaluminum diacrylate, aluminum triacrylate, and the like.

The content of the metal acrylate crosslinking agent is preferably 1 to 20 parts by mass, and more preferably 4 to 12 parts by mass, based on the total amount (=100 parts by mass) of the α-olefin thermoplastic resin (A) and the oil-extended ethylene copolymer (B). If the content of the metal acrylate crosslinking agent is within the above range, the balance between rubber elasticity and flexibility is improved. If the content of the metal acrylate crosslinking agent is less than 1 part by mass, rubber elasticity may decrease due to insufficient crosslinking. If the content of the metal acrylate crosslinking agent exceeds 20 parts by mass, fluidity may decrease.

[1-4-6] Bismaleimide Crosslinking Agent;

Examples of the bismaleimide crosslinking agent include N,N'-m-phenylenebismaleimide and the like. The bismaleimide crosslinking agent is normally used as a crosslinking promoter when using the organic peroxide. A crosslinking reaction also occurs when using only the bismaleimide crosslinking agent. The content of the bismaleimide crosslinking agent is preferably 0.05 to 10 parts by mass, more preferably 0.1 to 5 parts by mass, and particularly preferably 0.2 to 2 parts by mass, based on the total amount (=100 parts by mass) of the α-olefin thermoplastic resin (A) and the oil-extended ethylene copolymer (B). If the content of the bismaleimide crosslinking agent is within the above range, the balance between rubber elasticity and flexibility is improved. If the content of the bismaleimide crosslinking agent is less than 0.05 parts by mass, rubber elasticity may decrease due to insufficient crosslinking. If the content of the bismaleimide crosslinking agent exceeds 10 parts by mass, fluidity may decrease.

[1-5] Other Components;

The thermoplastic elastomer composition according to one embodiment of the present invention may be obtained by heating the polymer composition that may appropriately include additives (e.g., coloring agent, filler, antioxidant, antistatic agent, weathering stabilizer, UV absorber, lubricants, anti-blocking agent, seal improver, nucleating agent, flame retardant, antifungal agent, fungicide, tackifier, softener, and plasticizer) in addition to the α-olefin thermoplastic resin (A), the oil-extended ethylene copolymer (B), the second mineral oil-based softener (C), and the crosslinking agent.

Examples of the coloring agent include titanium oxide, carbon black, and the like. Examples of the filler include glass fibers, carbon fibers, metal fibers, aramid fibers, glass beads, mica, calcium carbonate, potassium titanate whiskers, talc, barium sulfate, glass flakes, fluororesins, and the like.

The additives may be added to the polymer composition, or may be added after dynamic heating of the polymer composition in the presence of the crosslinking agent.

[1-6] Dynamic Heating;

The thermoplastic elastomer composition according to one embodiment of the present invention is obtained by dynamically heating the polymer composition that includes the components (A) and (B) in the presence of the crosslinking agent. The expression "dynamically heating" used herein refers to melting, kneading, and dispersing the components (A) and (B) while crosslinking the component (B) in the presence of the crosslinking agent. This makes it possible to obtain an olefin thermoplastic elastomer composition having a structure in which the partially or completely crosslinked component (B) floats in the component (A) (i.e., island structure).

The dynamic heating temperature is preferably 150 to 250° C. If the dynamic heating temperature is within the above range, the balance between the meltability of the component (A) and crosslinking reactivity is improved. The dynamic heating time is preferably 20 seconds to 320 minutes, and more preferably 30 seconds to 25 minutes. The applied shear force expressed by the shear rate is preferably 10 to 20,000/sec, and more preferably 100 to 10,000/sec.

Examples of an apparatus used for dynamic heating include batch-type kneaders such as a pressure kneader, a Banbury mixer, and a Brabender, continuous kneaders such as a single-screw extruder, a twin-screw extruder, a continuous kneader, and a feeder ruder, and a combination of these.

The thermoplastic elastomer composition according to the present invention may be used as a seal material. When using the thermoplastic elastomer composition as a seal material, it is preferable that the thermoplastic elastomer composition further include a hydrogenated diene polymer. Specifically, the capability of retaining the mineral oil-based softener (first mineral oil-based softener and second mineral oil-based softener (C)) is improved by adding the hydrogenated diene polymer.

The hydrogenated diene polymer is preferably at least one of a hydrogenated product (D1): a polymer that includes a monomer unit derived from a conjugated diene compound and a hydrogenated product (D2): a polymer that includes a monomer unit derived from a conjugated diene compound and a monomer unit derived from a vinyl aromatic compound.

Examples of the hydrogenated product (D1) include a hydrogenated butadiene block copolymer and the like. Examples of the hydrogenated product (D2) include a hydrogenated styrene-butadiene block copolymer, a hydrogenated styrene-isoprene block copolymer, a hydrogenated styrene-butadiene-isoprene block copolymer, and the like.

The hydrogenation rate of the hydrogenated diene polymer is preferably 70% or more, more preferably 90% or more, and particularly preferably 95% or more. The "hydrogenation rate" refers to the ratio of the number of olefinic unsaturated bonds included in the side chain or the main chain of the conjugated diene units that form the hydrogenated diene polymer to the number of olefinic unsaturated bonds included in the side chain or the main chain of the conjugated diene units that form the diene polymer before hydrogenation.

The content of the hydrogenated diene polymer is preferably 0 to 50 parts by mass, more preferably 0.5 to 45 parts by mass, and particularly preferably 1 to 40 parts by mass, based on the total amount (=100 parts by mass) of the α-olefin thermoplastic resin (A), the oil-extended ethylene copolymer (B), and the second mineral oil-based softener (C). If the content of the hydrogenated diene polymer exceeds 50 parts by mass, the fluidity of the thermoplastic elastomer composition may deteriorate.

The hydrogenated diene polymer may be added to the polymer composition before dynamic heating, or may be added after dynamic heating of the polymer composition.

The thermoplastic elastomer composition according to the present invention may be used as a damping material. When using the thermoplastic elastomer composition as a damping material, it is preferable that a sheet-shaped specimen (length: 120 mm, width: 120 mm, thickness: 2 mm) obtained by injection-molding the thermoplastic elastomer composition at a cylinder temperature of 250° C., a mold temperature of 50° C., and an injection speed of 50 mm/sec satisfy the expression "(tensile elongation at break ($E_B$) in flow direction/tensile elongation at break ($E_B$) in direction perpendicular to flow direction)≦1.5".

When using the thermoplastic elastomer composition as a damping material, it is preferable that the thermoplastic elastomer composition further include a damping agent. It is more preferable that the thermoplastic elastomer composition have a loss tangent (tan δ) measured at a temperature of 25° C. and a frequency of 1.0 Hz of 0.1 or more.

The damping agent is at least one material selected from an ethylene-α-olefin copolymer rubber (E1) having a limiting viscosity [η] measured at 135° C. in a decalin solvent of 1.8 to 2.3 dl/g, an isobutylene-isoprene copolymer rubber (E2), and a styrene thermoplastic elastomer (E3). It is preferable that the total content of the ethylene-α-olefin copolymer rubber (E1), the isobutylene-isoprene copolymer rubber (E2), and the styrene thermoplastic elastomer (E3) in the damping agent be 10 to 30 mass % based on the total amount (=100 mass %) of the oil-extended ethylene copolymer (B), the ethylene-α-olefin copolymer rubber (E1), the isobutylene-isoprene copolymer rubber (E2), and the styrene thermoplastic elastomer (E3). A damping material that exhibits excellent vibration absorption properties can be obtained by utilizing the thermoplastic elastomer composition that further includes the damping agent.

The limiting viscosity [η] of the ethylene-α-olefin copolymer rubber (E1) is preferably 1.8 to 2.3 dl/g, more preferably 1.8 to 2.2 dl/g, and particularly preferably 1.9 to 2.2 dl/g. If the limiting viscosity [η] of the ethylene-α-olefin copolymer rubber (E1) is less than 1.8 dl/g, tensile fracture strength may decrease. Moreover, the mineral oil-based softener may bleed out. If the limiting viscosity [η] of the ethylene-α-olefin copolymer rubber (E1) exceeds 2.3 dl/g, the loss tangent (tan δ) may decrease.

The content of the ethylene-α-olefin copolymer rubber (E1) is preferably 0 to 30 mass % based on the total amount (=100 mass %) of the oil-extended ethylene copolymer (B), the ethylene-α-olefin copolymer rubber (E1), the isobutylene-isoprene copolymer rubber (E2), and the styrene thermoplastic elastomer (E3). If the content of the ethylene-α-olefin copolymer rubber (E1) exceeds 30 mass %, the tensile elongation at break may become anisotropic. Moreover, the mineral oil-based softener may bleed out.

Specific examples of the isobutylene-isoprene copolymer rubber (E2) include a copolymer rubber obtained by copolymerizing isobutylene, isoprene, and an aromatic divinyl compound (e.g., divinylbenzene) (see U.S. Pat. No. 3,584,080), and the like.

The content of the isobutylene-isoprene copolymer rubber (E2) is preferably 0 to 30 mass % based on the total amount (=100 mass %) of the oil-extended ethylene copolymer (B), the ethylene-α-olefin copolymer rubber (E1), the isobutylene-isoprene copolymer rubber (E2), and the styrene thermoplastic elastomer (E3). If the content of the isobutylene-isoprene copolymer rubber (E2) exceeds 30 mass %, the mineral oil-based softener may bleed out. Moreover, the mechanical properties of the damping material may deteriorate.

The styrene thermoplastic elastomer (E3) is a copolymer that includes a constituent unit derived from styrene and a constituent unit derived from a conjugated diene. Butadiene, isoprene, isobutylene, or the like may be used as the conjugated diene.

The content of the styrene thermoplastic elastomer (E3) is preferably 0 to 30 mass % based on the total amount (=400 mass %) of the oil-extended ethylene copolymer (B), the ethylene-α-olefin copolymer rubber (E1), the isobutylene-isoprene copolymer rubber (E2), and the styrene thermoplastic elastomer (E3). If the content of the styrene thermoplastic elastomer (E3) exceeds 30 mass %, the mineral oil-based softener may bleed out.

[2] Method of Producing Thermoplastic Elastomer Composition;

The thermoplastic elastomer composition according to the present invention may be obtained, for example, by dynamically heating the polymer composition in the presence of the above mentioned crosslinking agent, the polymer composition comprising the above mentioned α-olefin thermoplastic resin (A), and the above mentioned oil-extended ethylene copolymer (B) that includes an ethylene copolymer that satisfies the following conditions (1) and (2), and 50 to 150 parts by mass of a first mineral oil-based softener based on 100 parts by mass of the ethylene copolymer, the content of the oil-extended ethylene copolymer (B) being 30 mass % or more based on the total amount (=100 mass %) of the polymer component including the α-olefin thermoplastic resin (A) and the oil-extended ethylene copolymer (B).

Condition (1): A limiting viscosity [η] measured at 135° C. in a decalin solvent of 5.5 to 9.0 dl/g.

Condition (2): A ratio (Mw/Mn) of the weight average molecular weight (Mw) to the number average molecular weight (Mn) of 3 or less.

Specific three aspects of the production method are given below. A first aspect of the production method includes kneading the components (A) and (B) optionally together with the component (C) using a batch-type kneader set at a temperature at which the components (A) and (B) are sufficiently melted to obtain a kneaded product, adding the crosslinking agent to the kneaded product, and dynamically heating the mixture in the presence of the crosslinking agent. A second aspect of the production method includes kneading the components (A) and (B) optionally together with the component (C) using a batch-type kneader set at a temperature at which the components (A) and (B) are sufficiently melted to obtain a kneaded product. The kneaded product and the crosslinking agent are then added to a continuous kneader, and the mixture is dynamically heated using the continuous kneader. A third aspect of the production method includes adding the components (A) and (B) and the crosslinking agent to a continuous kneader optionally together with the component (C), and dynamically heating the mixture using the continuous kneader.

EXAMPLES

The present invention is further described below by way of examples. Note that the present invention is not limited to the following examples. In the examples and comparative examples, the units "parts" and "%" respectively refer to "parts by mass" and "mass %", unless otherwise indicated. The following measuring methods were employed in the examples and comparative examples.

Limiting Viscosity [η];

The limiting viscosity [η] of the ethylene copolymer was measured in a decalin solvent at 135° C. using an Ubbelohde viscometer.

Ratio (Mw/Mn) of Weight Average Molecular Weight (Mw) to Number Average Molecular Weight (Mn);

The weight average molecular weight (Mw) and the number average molecular weight (Mn) of the ethylene copolymer were measured using a gel permeation chromatograph ("PL-GPC220" manufactured by Polymer Laboratories Ltd.), and the ratio (Mw/Mn) of the weight average molecular weight (Mw) to the number average molecular weight (Mn) was calculated. The ratio (Mw/Mn) is indicated by "Mw/Mn" in Table 1. A column MIXED-B (manufactured by Polymer Laboratories Ltd.) was used. The mobile phase was orthodichlorobenzene, the temperature was 135° C., and the concentration was 0.1%. A differential refractometer was used as the detector.

Ratio of Area Corresponding to Polystyrene-Reduced Molecular Weight of 100,000 or Less;

The ratio of an area corresponding to a polystyrene-reduced molecular weight of 100,000 or less was calculated from the gel permeation chromatogram obtained as described in the preceding section "Ratio (Mw/Mn) of weight average molecular weight (Mw) to number average molecular weight (Mn)". The ratio thus calculated is indicated by "Area ratio (%)" in Table 1.

Compression Set;

The compression set (index of elastic recovery) was measured in accordance with JIS K 6262 at a temperature of 70° C. and a compression of 25% for 22 hours. A lower compression set indicates better elastic recovery.

Tensile Strength, Maximum Elongation, and Hardness

The tensile strength, the maximum elongation, and the hardness were measured in accordance with JIS K 6301 using a tabular sheet (120×120×2 mm (length×width×thickness)) produced by injection molding. The tabular sheet was produced using an injection molding machine ("J-110AD" manufactured by Japan Steel Works Ltd., clamping force: 110 t).

Fluidity

The melt flow rate (MFR) was measured in accordance with JIS K 7210 at a temperature of 230° C. and a load of 21.2 N (2.16 kg) or 49 N (5 kg). The measured value was taken as the fluidity evaluation value.

Injection Moldability;

A tabular sheet (molded article) (120×120×2 mm (length×width×thickness)) was produced by injection molding using an injection molding machine ("J-110AD" manufactured by Japan Steel Works Ltd., clamping force: 110 t). A sink mark, burn mark, and transfer properties were evaluated using the molded article in accordance with the following criteria.

Good: No sink mark or burn mark was observed, and the mold pattern was sufficiently transferred (i.e., injection moldability was excellent).

Bad: A sink mark, burn mark, or poor transfer was observed (i.e., injection moldability was inferior).

Oil Bleeding;

The tabular molded article obtained by injection molding was allowed to stand in a cold bath (−15° C.) for three days. A change in the appearance of the surface of the molded article was observed with the naked eye, and the softener retention capability was evaluated in accordance with the following criteria.

Good: A change in the appearance of the molded article was not observed (i.e., the softener retention capability was excellent).

Bad: A change (e.g., bleeding) in the appearance of the molded article was observed (i.e., the softener retention capability was inferior).

Adhesion;

The following olefin vulcanized rubber adherend was attached in advance to the split mold of the injection molding machine used when evaluating the injection moldability. The thermoplastic elastomer composition was injection-molded into the hollow portion inside the split mold to which the olefin vulcanized rubber adherend was attached, to obtain a tabular sheet (120×120×2 mm (length×width×thickness)) in which the thermoplastic elastomer composition adhered to the olefin vulcanized rubber adherend. The tabular sheet was punched using a JIS No. 3 dumbbell cutter to obtain an adhesion evaluation specimen (dumbbell specimen). The tabular sheet was punched so that the side where the thermoplastic elastomer composition adhered to the olefin vulcanized rubber adherend was perpendicular to the tensile direction and was positioned between the bench marks. The adhesive strength of the specimen was measured using a tensile tester ("AG-2000" manufactured by Shimadzu Corporation). A higher adhesive strength indicates better adhesion.

The olefin vulcanized rubber adherend used when evaluating the adhesion was prepared as follows. Specifically, 145 parts of carbon black ("Seast 116" manufactured by Tokai Carbon Co., Ltd.), 85 parts of a paraffin process oil ("PW380" manufactured by Idemitsu Kosan Co., Ltd.), 5 parts of active zinc oxide (manufactured by Sakai Chemical Industry Co., Ltd.), 1 part of stearic acid (manufactured by Asahi Denka Kogyo KK), 1 part of a processing aid ("Hitanol 1501" manufactured by Hitachi Chemical Co., Ltd.), 2 parts of a release agent ("Struktol WB212" manufactured by Schill & Seilacher GmbH), and 1 part of a plasticizer (polyethylene glycol) were added to 100 parts of an ethylene/propylene/5-ethylidene-2-norbornene ternary copolymer ("EP103AF" manufactured by JSR Corporation, content of structural unit derived from ethylene: 59%, content of structural unit derived from propylene: 36.5%, Mooney viscosity: 91) to obtain a mixture.

The mixture was kneaded at 50° C. and 70 rpm for 2.5 minutes using a Banbury mixer to obtain a kneaded product. After the addition of 10 parts of a dehydrating agent ("Besta PP" manufactured by Inoue Sekkai Kogyo), a vulcanization accelerator (1 part of "M", 1 part of "PX", 0.5 parts of "TT", and 1 part of "D", manufactured by Ouchi Shinko Chemical Industrial Co., Ltd.), and 2.2 parts of sulfur to the kneaded product, the mixture was kneaded at 50° C. using an open roll. The kneaded product was vulcanized at 170° C. for 10 minutes to obtain a vulcanized rubber sheet (120×120×2 mm (length×width×thickness). The sheet was cut to a length of 60 mm and a width of 50 mm using a dumbbell cutter to obtain an olefin vulcanized rubber adherend.

Initial Sliding Properties and Permanent Sliding Properties;

The dynamic friction coefficient was measured as an index of the initial sliding properties and the permanent sliding properties, and the initial sliding properties and the permanent sliding properties were evaluated based on the dynamic friction coefficient. Specifically, the dynamic friction coefficient of the sheet-shaped molded article prepared in the section "Injection moldability" with respect to a glass specimen (length: 25.7 mm, width: 3 mm) was measured at room temperature using a reciprocating sliding wear tester (manufactured by Tosoku Seimitsu Kogyo, Co., Ltd.) (load: 500 g/8 mm$^2$ (contact pressure: 63 g/mm$^2$), glass specimen sliding speed: 1000 mm/min (one stroke: 100 mm)).

The specimen for evaluating the initial sliding properties and the permanent sliding properties was prepared by injection-molding the thermoplastic elastomer composition, and allowing the molded product to stand for one day. In Table 3, "Initial sliding properties" indicates the dynamic friction coefficient at the first stroke, and "Permanent sliding properties" indicates the dynamic friction coefficient at the 1000th stroke.

The α-olefin thermoplastic resin (α-olefin crystalline thermoplastic resin (a1) and α-olefin amorphous thermoplastic resin (a2)), first mineral oil-based softener, second mineral oil-based softener, crosslinking agent, crosslinking promoter, aging preventive, and silicone oil used in the examples and comparative examples are as follows.

As the α-olefin crystalline thermoplastic resin (a1), a propylene-ethylene random copolymer ("Prime Polypro B241" manufactured by Prime Polymer Co., Ltd., density: 0.91 g/cm$^3$, MFR (230° C., 21.2N (2.16 kg)): 0.5 g/10 min, melting point: 143° C., elution volume (80° C.): 15%, "a-1-1" in Table 2), a propylene-ethylene-1-butene random copolymer ("Novatec PPFL02A" manufactured by Japan Polypropylene Corporation, density: 0.90 g/cm$^3$, MFR (230° C., 21.2 N): 20 g/10 min, melting point: 139° C., elution volume (80° C.): 25%, "a-1-2" in Table 2), a propylene-ethylene random copolymer ("Wintec WMG03" manufactured by Japan Polypropylene Corporation, density: 0.90 g/cm$^3$, MFR (230° C., 21.2 N): 30 g/10 min, melting point: 143° C., elution volume (80° C.): 3%, "a-1-3" in Table 3), and a propylene-ethylene random copolymer ("Novatec PP FX4E" manufactured by Japan Polypropylene Corporation, density: 0.90 g/cm$^3$, MFR (230° C., 21.2 N): 5 g, melting point: 132° C., elution volume (80° C.): 40%, "a-1-4" in Table 3), were used.

As the α-olefin amorphous thermoplastic resin (a2), a propylene-1-butene amorphous copolymer ("REXtac 2780" manufactured by Huntsman Advanced Materials KK, density: 0.87 g/cm$^3$, melt viscosity (190° C.): 8000 mPa·s, "a-2-1" in Table 2), and a propylene-ethylene-1-butene amorphous copolymer ("Vestoplast 828" manufactured by EvonicDegussa GmbH, melt viscosity (190° C.): 25,000 mPa·s, "a-2-2" in Table 3) were used.

As the first mineral oil-based softener and the second mineral oil-based softener, "Diana Process Oil PW90" (manufactured by Idemitsu Kosan Co., Ltd., (aniline point: 128° C.)) was used. This product is indicated by "Mineral oil-based softener" in Tables 1 and 2.

As the crosslinking agent, 2,5-dimethyl-2,5-di(t-butylperoxy)hexane ("Perhexa 25B-40" manufactured by NOF Corporation, "d-1" in Table 2) was used. As the crosslinking promoter, divinylbenzene ("Divinylbenzene (81%)" manufactured by Nippon Steel Chemical Co., Ltd., "d-2" in Table 2) and N,N'-m-phenylenebismaleimide ("Vulnoc PM" manufactured by Ouchishinko Chemical Industrial Co., Ltd., "d-3" in Table 2) were used. As the aging preventive, "Irganox 1010" (manufactured by Ciba Specialty Chemicals Co., Ltd.) was used. This product is indicated by "Anti-aging agent" in Table 2.

As the silicone oil, unmodified polydimethylsiloxane ("SH-200 Oil" manufactured by Dow Corning Toray Co., Ltd., kinematic viscosity: 100 mm$^2$/s, "e-1" in Table 3), unmodified polydimethylsiloxane ("SH-200 Oil" manufactured by Dow Corning Toray Co., Ltd., kinematic viscosity: 1000 mm$^2$/s, "e-2" in Table 3), and dimethyl silicone gum ("X-21-3043" manufactured by Shin-Etsu Silicone Co., Ltd., solution viscosity: 21,000 mm$^2$/s (30% xylene solution, 25° C.), "e-3" in Table 3), were used.

Synthesis Example 1

Production of Oil-Extended Ethylene Copolymer (B);

A copolymerization reaction was continuously carried out at a pressure of 1 MPa using a stainless steel autoclave (internal volume: 10 L) equipped with a stirrer, of which the internal atmosphere was replaced with nitrogen. Hexane (polymerization solvent) was continuously supplied at 62 L/h through a supply port provided on the lower side of the autoclave, and ethylene, propylene, and 5-ethylidene-2-norbornene were continuously supplied at 0.80 Nm$^3$/h, 2.0 L/h, and 0.11 L/h, respectively. Ethylaluminium sesquichloride and vanadium trichloride (catalyst) were continuously supplied at 13.585 g/h and 0.384 g/h, and hydrogen (molecular-weight modifier) was also continuously supplied at 0.4 NL/h. The temperature inside the autoclave was maintained at 22° C. After completion of the reaction, a polymer obtained by the copolymerization reaction was moved to a storage vessel. 120 parts of Diana Process oil PW-90 (manufactured by Idemitsu Kosan Co., Ltd.) (first mineral oil-based softener) was added to 100 parts of the copolymer, and the mixture was stirred. A copolymer rubber was precipitated by steam stripping to obtain an oil-extended ethylene copolymer (b-1) (oil-extended ethylene copolymer (B)).

The oil-extended ethylene copolymer (b-1) was evaluated for the limiting viscosity [η], the ratio (Mw/Mn) of the weight average molecular weight (Mw) to the number average molecular weight (Mn), and the ratio of an area corresponding to a polystyrene-reduced molecular weight of 100,000 or less. The oil-extended ethylene copolymer (b-1) had a limiting viscosity [η] of 6.7, a ratio (Mw/Mn) of 2.4, and a ratio of an area corresponding to a polystyrene-reduced molecular weight of 100,000 or less of 0.5%. The content of a structural unit derived from ethylene ("Ethylene" in Table 1), the content of a structural unit derived from propylene ("Propylene" in Table 1), and the content of a structural unit derived from 5-ethylidene-2-norbornene ("5-Ethylidene-2-norbornene" in Table 1) in the oil-extended ethylene copolymer (b-1) were 67%, 26.5%, and 6.5%, respectively.

Synthesis Examples 2, 4, and 5

Oil-extended ethylene copolymers (b-2), (b-4), and (b-5) were produced in the same manner as in Synthesis Example 1, except for changing the amounts of ethylene, propylene, 5-ethylidene-2-norbornene, ethylaluminium sesquichloride, vanadium trichloride, and hydrogen and the polymerization temperature as shown in Table 1.

The oil-extended ethylene copolymers (b-1) to (b-5) were evaluated as described above. The evaluation results are shown in Table 1.

TABLE 1

|  |  | Synthesis Example 1 | Synthesis Example 2 | Synthesis Example 3 | Synthesis Example 4 | Synthesis Example 5 |
|---|---|---|---|---|---|---|
| Ethylene | | 67 | 67 | 67 | 67 | 67 |
| Propylene | | 26.5 | 26.5 | 28.5 | 26.5 | 26.5 |
| 5-Ethylidene-2-norbornene | | 6.5 | 6.5 | 4.5 | 6.5 | 6.5 |
| First mineral oil-based softener | | 120 | 120 | 100 | 120 | 20 |
| Oil-extended ethylene copolymer | | b-1 | b-2 | b-3 | b-4 | b-5 |
| Evaluation of ethylene copolymer | Limiting viscosity [η] | 6.7 | 5.8 | 4.7 | 5.7 | 2.4 |
|  | Mw/Mn | 2.4 | 2.4 | 3.7 | 3.8 | 2.3 |
|  | Area ratio (%) | 0.5 | 1.1 | 3.2 | 2.5 | 19 |

Synthesis Example 3

An oil-extended ethylene copolymer (b-3) was produced in the same manner as in Synthesis Example 1, except for continuously supplying ethylene, propylene, and 5-ethylidene-2-norbornene at 0.75 Nm$^3$/h, 1.4 L/h, and 0.10 L/h, continuously supplying vanadium trichloride at 1.216 g/h, continuously supplying hydrogen at 0.06 NL/h, maintaining the copolymerization temperature at 30° C., and adding 100 parts of the mineral oil-based softener.

The oil-extended ethylene copolymer (b-3) had a limiting viscosity [η] of 4.7, a ratio (Mw/Mn) of 3.7, and a ratio of an area corresponding to a polystyrene-reduced molecular weight of 100,000 or less of 3.2%.

Example 1

A pressure kneader (manufactured by Moriyama Co., Ltd.) heated at 150° C. was charged with 3.5 parts of a propylene/ethylene random copolymer (α-olefin crystalline thermoplastic resin (a1)), 3.5 parts of a propylene/1-butene amorphous copolymer (α-olefin amorphous thermoplastic resin (a2)), 65 parts of the oil-extended ethylene copolymer (b-1) produced in Synthesis Example 1, 28 parts of the second mineral oil-based softener ("Diana Process Oil PW90" manufactured by Idemitsu Kosan Co., Ltd.), and 0.1 parts of an anti-aging agent ("Irganox 1010" manufactured by Ciba Specialty Chemicals Co., Ltd.). The mixture was kneaded at 40 rpm for 15 minutes until the components were homogeneously dispersed. The resulting molten composition was pelletized using a feeder ruder (manufactured by Moriyama Co. Ltd.). After the addition of 1 part of 2,5-dimethyl-2,5-di(t-butylperoxy)hexane (crosslinking agent) and 0.85 parts of divinylbenzene (crosslinking promoter) to the pellets, the mixture was mixed for 30 seconds using a Henschel mixer. The mixture was supplied to a twin-screw extruder (unidirectional nonengagement-type screws, L/D=38.5, "PCM45" manufactured by Ikegai, Ltd.) at 40 kg/h, and extruded at 200° C. (screw rotational speed: 300 rpm, residence time: 2 min) while dynamically heating the mixture to obtain a thermoplastic elastomer composition (I).

The thermoplastic elastomer composition (I) of Example 1 had a compression set of 22%, a tensile strength of 2.9 MPa, a maximum elongation of 660%, a hardness (Duro A, after 10 seconds) of 28, and a fluidity (230° C., 49N) of 79. The injection moldability and oil bleeding of the thermoplastic elastomer composition (I) were evaluated as "Good", and the adhesion was 0.9 MPa.

Examples 2 to 4 and Comparative Examples 1 to 5

Thermoplastic elastomer compositions (II) to (VIII) were obtained in the same manner as in Example 1, except for employing the composition shown in Table 2. The thermoplastic elastomer compositions (II) to (VIII) were evaluated for the above items (compression set, tensile strength, maximum elongation, hardness (Duro A, after 10 seconds), fluidity, injection moldability, oil bleeding, and adhesion). The evaluation results are shown in Table 2. In Comparative Example 3, a thermoplastic elastomer composition could not be obtained since the mineral oil-based softener could not be retained ("Could not be produced" in Table 2).

TABLE 2

| | | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| α-Olefin thermoplastic resin | a-1-1 | 3.5 | 6 | 5 | 6 | 3.5 | 6 | 6 | 6 | 5 |
| | a-1-2 | — | — | 15 | — | — | — | — | — | 15 |
| | a-2-1 | 3.5 | 6 | 5 | 6 | 3.5 | 6 | 6 | 6 | 5 |
| Oil-extended ethylene copolymer | b-1 | 65 | 80 | 75 | — | — | — | — | — | — |
| | b-2 | — | — | — | 80 | — | — | — | — | — |
| | b-3 | — | — | — | — | 59 | — | — | — | — |
| | b-4 | — | — | — | — | — | 80 | — | — | — |
| | b-5 | — | — | — | — | — | — | 45 | 80 | 75 |
| Second mineral oil-based softener | | 28 | 8 | — | 8 | 34 | 8 | 43 | 8 | — |
| Crosslinking agent | d-1 | 1 | 1.2 | 1.2 | 1.2 | 1 | 1.2 | 1.2 | 1.2 | 1.2 |
| Crosslinking promoter | d-2 | 0.85 | 0.85 | — | 0.85 | 0.85 | 0.85 | 0.85 | 0.85 | — |
| | d-3 | — | — | 0.5 | — | — | — | — | — | 0.5 |
| Anti-aging agent | | 0.1 | 0.1 | 0.1 | 0.1 | 0.1 | 0.1 | 0.1 | 0.1 | 0.1 |
| Thermoplastic elastomer composition | | (I) | (II) | (III) | (IV) | (V) | (VI) | — | (VII) | (VIII) |
| Compression set (%) | | 22 | 25 | 55 | 26 | 30 | 33 | Could not be produced | 39 | 66 |
| Tensile strength (MPa) | | 2.9 | 3.6 | 9.8 | 3.5 | 2.6 | 3.4 | | 2.3 | 7.6 |
| The maximum elongation (%) | | 660 | 670 | 740 | 660 | 570 | 640 | | 430 | 610 |
| Hardness (Duro A, after 10 seconds) | | 28 | 36 | 81 | 36 | 28 | 37 | | 62 | 93 |
| Fluidity (230° C., 49N) | | 79 | 61 | 360 | 49 | 50 | 44 | | 0.1 | 3 |
| Injection moldability | | Good | Good | Good | Good | Good | Good | | bad | bad |
| Oil bleeding | | Good | Good | Good | Good | bad | Good | | Good | Good |
| Adhesion (MPa) | | 0.9 | 1.2 | 3.6 | 1.1 | 0.8 | 1.0 | | 0.3 | 1.4 |

Examples 5 to 7 and Comparative Examples 6 to 9

Thermoplastic elastomer compositions (IX) to (XV) were obtained in the same manner as in Example 1, except for employing the composition shown in Table 3. The thermoplastic elastomer compositions (IX) to (XV) were evaluated for the above items (compression set, tensile strength, maximum elongation, hardness (Duro A, after 10 seconds), fluidity (230° C., 21.2 N (2.16 kg)), injection moldability, oil bleeding, adhesion, initial sliding properties, and permanent sliding properties).

The evaluation results are shown in Table 3. In Comparative Examples 6, 7, and 9, the permanent sliding properties could not be measured since the specimen broke before the 1000th stroke was reached. This means that the permanent sliding properties were significantly poor.

TABLE 3

|  |  | Example 5 | Example 6 | Example 7 | Comparative Example 6 | Comparative Example 7 | Comparative Example 8 | Comparative Example 9 |
|---|---|---|---|---|---|---|---|---|
| α-Olefin thermoplastic resin | a-1-1 | — | 2.5 | 5 | — | — | — | — |
|  | a-1-2 | — | — | — | — | — | — | — |
|  | a-1-3 | 4 | 10 | 15 | 4 | 4 | 4 | — |
|  | a-1-4 | — | — | — | — | — | — | 4 |
|  | a-2-1 | 4 | — | — | 4 | 4 | 4 | 4 |
|  | a-2-2 | — | 2.5 | 5 | — | — | — | — |
| Oil-extended ethylene copolymer | b-1 | 87 | 85 | 75 | — | — | — | — |
|  | b-2 | — | — | — | — | — | — | — |
|  | b-3 | — | — | — | 79 | 79 | 79 | 79 |
|  | b-4 | — | — | — | — | — | — | — |
|  | b-5 | — | — | — | — | — | — | — |
| Second mineral oil-based softener |  | 5 | — | — | 13 | 13 | 13 | 13 |
| Crosslinking agent | d-1 | 1.6 | 1.2 | 1.2 | 1.6 | 1.6 | 1.6 | 1.6 |
| Crosslinking promoter | d-2 | 1.2 | — | — | 1.2 | 1.2 | 1.2 | 1.2 |
|  | d-3 | — | 0.5 | 0.5 | — | — | — | — |
| Silicone oil | e-1 | 4 | 1 | 2 | — | 4 | 4 | 4 |
|  | e-2 | 2 | 1 | 2 | — | — | 2 | 2 |
|  | e-3 | 0.5 | 1.5 | 1.5 | — | — | 0.5 | 0.5 |
| Anti-aging agent |  | 0.1 | 0.1 | 0.1 | 0.1 | 0.1 | 0.1 | 0.1 |
| Thermoplastic elastomer composition |  | (IX) | (X) | (XI) | (XII) | (XIII) | (XIV) | (XV) |
| Compression set (%) |  | 23 | 44 | 57 | 32 | 33 | 34 | 37 |
| Tensile strength (MPa) |  | 2.1 | 4.6 | 7.8 | 2.8 | 2.2 | 1.7 | 1.4 |
| The maximum elongation (%) |  | 550 | 600 | 650 | 610 | 560 | 490 | 440 |
| Hardness (Duro A, after 10 seconds) |  | 32 | 55 | 82 | 32 | 32 | 31 | 30 |
| Fluidity (230° C., 21.2N) |  | 15 | 1.2 | 80 | 2 | 6 | 9 | 8 |
| Injection moldability |  | Good | Good | Good | Good | Good | Good | Good |
| Oil bleeding |  | Good | Good | Good | Good | Good | Good | Good |
| Adhesion (MPa) |  | 1.0 | 2.5 | 3.5 | 1.0 | 0.9 | 0.7 | 0.5 |
| Initial sliding properties |  | 0.3 | 0.2 | 0.1 | 1.0 | 0.3 | 0.3 | 0.4 |
| Permanent sliding properties |  | 0.3 | 0.2 | 0.1 | Could not be measured | Could not be measured | 0.9 | Could not be measured |

As is clear from Table 2, the thermoplastic elastomer compositions (I) to (IV) of Examples 1 to 4 exhibited excellent rubber elasticity, fluidity, adhesion, and softener retention capability. The thermoplastic elastomer composition (V) of Comparative Example 1 had inferior rubber elasticity, fluidity, and softener retention capability as compared with the thermoplastic elastomer composition of Example 1 since the limiting viscosity [η] and the ratio Mw/Mn of the oil-extended ethylene copolymer were outside the range of the present invention. The thermoplastic elastomer composition (VI) of Comparative Example 2 had inferior rubber elasticity, fluidity, and adhesion as compared with the thermoplastic elastomer composition of Example 2 since the ratio Mw/Mn of the oil-extended ethylene copolymer was outside the range of the present invention. In Comparative Example 3, the softener retention capability was insufficient since the limiting viscosity [η] of the oil-extended ethylene copolymer was outside the range of the present invention. As a result, a thermoplastic elastomer composition could not be produced. The thermoplastic elastomer compositions of Comparative Examples 4 and 5 had inferior rubber elasticity, fluidity, and adhesion since the limiting viscosity [η] of the oil-extended ethylene copolymer was outside the range of the present invention.

As is clear from Table 3, the thermoplastic elastomer compositions (IX) to (XI) of Examples 5 to 7 exhibited excellent rubber elasticity, fluidity, adhesion, softener retention capability, initial sliding properties, and permanent sliding properties. The thermoplastic elastomer compositions (XII) to (XV) of Comparative Examples 6 to 9 had inferior rubber elasticity, fluidity, and permanent sliding properties as compared with the thermoplastic elastomer composition (IX) of Example 5 since the limiting viscosity [η] and the ratio Mw/Mn of the oil-extended ethylene copolymer were outside the range of the present invention.

The invention claimed is:

1. A thermoplastic elastomer composition obtained by dynamically heating a polymer composition in the presence of a crosslinking agent, the polymer composition comprising an α-olefin thermoplastic resin (A), and an oil-extended ethylene copolymer (B),
   wherein B comprises:
   an ethylene copolymer having a limiting viscosity [η] measured at 135° C. in a decalin solvent of 5.5 to 9.0 dl/g, and a ratio, Mw/Mn, of weight average molecular weight, Mw, to number average molecular weight, Mn, of 3 or less; and
   50 to 150 parts by mass of a first mineral oil-based softener based on 100 parts by mass of the ethylene copolymer, the content of the oil-extended ethylene copolymer (B) is 30 mass % or more based on the total amount, 100 mass %, of a polymer component comprising the α-olefin thermoplastic resin (A) and the oil-extended ethylene copolymer (B),
   wherein the ethylene copolymer is an ethylene-α-olefin-nonconjugated polyene copolymer.

2. The thermoplastic elastomer composition according to claim 1, wherein the mass ratio, (A)/(B), of the α-olefin thermoplastic resin (A) to the oil-extended ethylene copolymer (B) comprised in the polymer component is 5/95 to 70/30.

3. The thermoplastic elastomer composition according to claim 1, wherein the polymer composition further comprises (C) a second mineral oil-based softener.

4. The thermoplastic elastomer composition according to claim 1, wherein the oil-extended ethylene copolymer (B) is obtained by removing a solvent from a mixture that comprises the ethylene copolymer, the first mineral oil-based softener, and a solvent.

5. The thermoplastic elastomer composition according to claim 1, wherein the α-olefin thermoplastic resin (A) comprises (a1) an α-olefin crystalline thermoplastic resin and (a2) an α-olefin amorphous thermoplastic resin.

6. The thermoplastic elastomer composition according to claim 5, wherein the polymer composition comprises:
   2 to 50 mass % of the α-olefin crystalline thermoplastic resin (a1);
   2 to 10 mass % of the α-olefin amorphous thermoplastic resin (a2); and
   40 to 95 mass % of the oil-extended ethylene copolymer (B), based on 100 mass % of the α-olefin crystalline thermoplastic resin (a1), the α-olefin amorphous thermoplastic resin (a2), and the oil-extended ethylene copolymer (B) in total, and
   the α-olefin amorphous thermoplastic resin (a2) comprises at least one repeating unit selected from the group consisting of a repeating unit derived from ethylene, a repeating unit derived from propylene, and a repeating unit derived from 1-butene.

7. The thermoplastic elastomer composition according to claim 5, wherein the α-olefin crystalline thermoplastic resin (a1) has an elution volume at 80° C. of 30 mass % or less and a melting point of 155° C. or less.

8. The thermoplastic elastomer composition according to claim 5, wherein the polymer composition comprises 5 to 400 parts by mass of the second mineral oil-based softener (C), based on 100 parts by mass of the α-olefin crystalline thermoplastic resin (a1), the α-olefin amorphous thermoplastic resin (a2), and the oil-extended ethylene copolymer (B) in total.

9. The thermoplastic elastomer composition according to claim 2, wherein the polymer composition further comprises (C) a second mineral oil-based softener.

10. The thermoplastic elastomer composition according to claim 1, wherein the polymer composition further comprises (C) a second mineral oil-based softener.

11. The thermoplastic elastomer composition according to claim 2, wherein the oil-extended ethylene copolymer (B) is obtained by removing a solvent from a mixture that comprises the ethylene copolymer, the first mineral oil-based softener, and a solvent.

12. The thermoplastic elastomer composition according to claim 1, wherein the oil-extended ethylene copolymer (B) is obtained by removing a solvent from a mixture that comprises the ethylene copolymer, the first mineral oil-based softener, and a solvent.

13. The thermoplastic elastomer composition according to claim 3, wherein the oil-extended ethylene copolymer (B) is obtained by removing a solvent from a mixture that comprises the ethylene copolymer, the first mineral oil-based softener, and a solvent.

14. The thermoplastic elastomer composition according to claim 9, wherein the oil-extended ethylene copolymer (B) is obtained by removing a solvent from a mixture that comprises the ethylene copolymer, the first mineral oil-based softener, and a solvent.

15. The thermoplastic elastomer composition according to claim 10, wherein the oil-extended ethylene copolymer (B) is obtained by removing a solvent from a mixture that comprises the ethylene copolymer, the first mineral oil-based softener, and a solvent.

16. The thermoplastic elastomer composition according to claim 1, wherein said ethylene copolymer is prepared by gas-phase polymerization in the presence of a Ziegler-Natta catalyst and hydrogen gas is used in an amount of 0.01 to 20 ppm, as a molecular weight modifier.

17. The thermoplastic elastomer composition according to claim 1, wherein said ethylene copolymer is prepared by gas-phase polymerization in the presence of hydrogen gas in an amount of 0.01 to 20 ppm, as a molecular weight modifier.

18. The thermoplastic elastomer composition according to claim 1, wherein said ethylene copolymer is prepared by gas-phase polymerization in the presence of hydrogen gas as a molecular weight modifier.

* * * * *